United States Patent [19]

Melzig et al.

[11] Patent Number: 4,927,239

[45] Date of Patent: May 22, 1990

[54] ANTI-REFLECTION FILM FOR AN OPTICAL ELEMENT CONSISTING OF AN ORGANIC MATERIAL

[75] Inventors: Manfred Melzig, Wessling; Horst Rösler, both of Wessling; Medardus Schöbl, Landsberied, all of Fed. Rep. of Germany

[73] Assignee: Optische Werke G. Rodenstock, Munich, Fed. Rep. of Germany

[21] Appl. No.: 300,192

[22] Filed: Jan. 23, 1989

Related U.S. Application Data

[63] Continuation of Ser. No. 240,480, Sep. 6, 1988, abandoned, which is a continuation of Ser. No. 119,237, Sep. 25, 1987, which is a continuation of Ser. No. 740,920, Jul. 11, 1985, abandoned.

[30] Foreign Application Priority Data

Sep. 12, 1983 [DE] Fed. Rep. of Germany ....... 3332872

[51] Int. Cl.$^5$ .............................................. G02B 1/10
[52] U.S. Cl. ..................................... 350/165; 350/164
[58] Field of Search ......................... 350/164, 165, 166

[56] References Cited

U.S. PATENT DOCUMENTS

| | | |
|---|---|---|
| 3,958,042 | 5/1976 | Katsube et al. ................ 350/164 X |
| 4,168,113 | 9/1979 | Chang . | |
| 4,196,246 | 4/1980 | Takayama et al. ............. 350/164 X |
| 4,246,043 | 1/1981 | Lindmayer . | |
| 4,313,647 | 2/1982 | Takazawa ........................... 350/164 |
| 4,387,960 | 6/1983 | Tani ................................... 350/164 |
| 4,609,267 | 9/1986 | Deguchi et al. .................... 350/1.6 |

FOREIGN PATENT DOCUMENTS

| | | |
|---|---|---|
| 300401 | 7/1972 | Austria . |
| 2210505 | 3/1972 | Fed. Rep. of Germany . |
| 2728127 | 1/1978 | Fed. Rep. of Germany . |
| 2751221 | 7/1978 | Fed. Rep. of Germany . |
| 2511047 | 2/1983 | France . |
| 58-35501 | 3/1983 | Japan . |
| 59-48702 | 4/1984 | Japan . |
| 292125 | 10/1953 | Switzerland ........................ 350/164 |

*Primary Examiner*—Bruce Y. Arnold
*Assistant Examiner*—Martin Lerner
*Attorney, Agent, or Firm*—Kalish & Gilster

[57] ABSTRACT

An anti-reflection film for a clearly transparent optical element consisting of an organic material, for example an ophthalmic spectacle lens, is described. The anti-reflection film comprises a number of layers of which at least one consists of a metallic oxide. In one version of this invention, at least one layer consists of erbium oxide, terbium oxide, dysprosium oxide or holmium oxide. In another version of this invention, one layer consisting of samarium oxide, europium oxide, neodymium oxide or ytterbium oxide with a thickness of lambda/10 to lambda/20 is provided. In a third version of this invention, one layer consisting of yttrium oxide is deposited by evaporation on a layer of silicon dioxide, where the latter is deposited directly on the optical element consisting of an organic material.

4 Claims, 1 Drawing Sheet

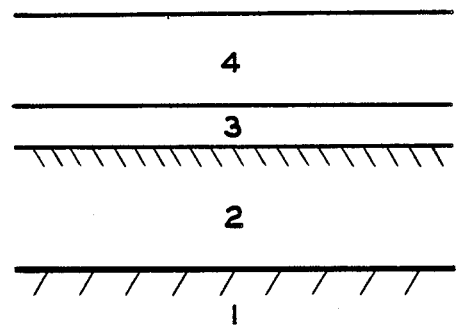

ANTI-REFLECTION FILM FOR AN OPTICAL ELEMENT CONSISTING OF AN ORGANIC MATERIAL

CROSS-REFERENCE TO RELATED APPLICATION

This application is a continuation of application Ser. No. 07/240,480, filed Sept. 6, 1988, abandoned, which is a continuation of application Ser. No. 07/119,237 filed Sept. 25, 1987, abandoned, which is a continuation of application Ser. No. 06/740,920, filed Sept. 11, 1985, abandoned, and is based upon International Application PCT/DE84/00189, having an international filing date of Sept. 12, 1984.

TECHNICAL BACKGROUND

This invention relates to an anti-reflection film for a clearly transparent optical element consisting of organic materials.

STATE OF THE ART

An anti-reflection film is known, for example, from printed reference publications DE-OS 22 10 505, DE-OS 27 51 221 or U.S. Pat. No. 4 196 246. The anti-reflection films known from these printed reference publications show a high refractive layer consisting of, for example, aluminium oxide ($Al_2O_3$) or chromic oxide ($Cr_2O_3$) in addition to layers with a low refractive index.

U.S. Pat. No. 4 196 246 also reveals multilayer coatings for optical elements consisting of an organic material which, in addition to layers consisting of $SiO_2$ also show high refractive layers consisting of oxides of cerium, indium, lanthanum, titanium or zircon.

These layers are conventionally deposited by a reactive evaporation of the corresponding metals or metallic oxides in an oxygen atmosphere. Reactive evaporation can lead to a layer construction which cannot be reproduced as the high refractive layer can show very different refractive indices due to the different oxides which may be produced during reactive evaporation. Layers with deposits may also be produced during reactive evaporation processes. This will also result in a much lower quality of the anti-reflection film.

The older German patent application P 33 35 557, now published as a printed reference, reveals a coating layer for a high refractive synthetic resin lens on to which an anti-reflection film can be deposited consisting for instance of yttrium oxide ($Y_2O_3$). According to this older German patent application an additional organic coating layer is provided on to which an anorganic coating layer is deposited and the anti-reflection film is then deposited on this layer. Furthermore, according to the older application the yttrium oxide is deposited in a "high-frequency plasma atmosphere" in argon gas.

The depositing of the layer construction described in this older patent application is complicated due to the use of a "high-frequency plasma atmosphere". Also, due to the deposition of an additional organic coating layer, a further process step becomes necessary which further increases the manufacturing costs.

REPRESENTATION OF THE INVENTION

The object of this invention is to disclose an anti-reflection film in which at least one high refractive layer can be deposited without the use of oxygen, and which can be reproduced and manufactured at a reasonable cost.

A solution to this object according to this invention is revealed with its refinements in the patent claims.

In accordance with the invention the anti-reflection film comprises at least one high refractive layer consisting of erbium oxide ($Er_2O_3$), terbium oxide ($Tb_4O_7$), dysprosium oxide ($D_2O_3$) or holmium oxide ($Hl_2O_3$). Up until now, layers consisting of these materials have not been used for clearly transparent optical elements consisting of an organic material, such as for example ophthalmic spectacle lenses.

A surprising feature is that these layers can be deposited in such a way that the corresponding oxides are deposited by evaporation without the use of oxygen. In this way, these oxides are not reduced so that no metal particles are deposited in the layers deposited by evaporation. Furthermore, as the evaporation process is performed without the use of oxygen, no other oxide forms can be produced.

With this non-reactive depositing of the layers, which is surprisingly possible, a constant and reproducible refractive index is always achieved.

Another unexpected advantage of these oxides is that they show good adhesion property even when they are deposited at low substrate temperatures. This means that they are particularly well suited for just those anti-reflection films of an optical element consisting of an organic material as such elements should only be heated slightly during the application of the layers.

The oxides of samarium, europium, neodymium and ytterbium partially decompose when evaporated without the use of oxygen. This results in metal particles, which increase absorption, being deposited in the layer applied. This means that layers applied in a non-reactive process consisting of the materials herein described can only be used within certain limits for high refractive layers of a thickness up to $\lambda/2$.

Surprisingly, however, it was found that layers consisting of the metallic oxides herein described applied in a non-reactive process are useful for layers with a thickness of about between $\lambda/10$ and $\lambda/20$, and that they provide a refractive index which can be readily reproduced, while having only a negligible absorption effect. These metallic oxides, like the other metallic oxides described above, also have the additional advantage that they can be deposited by evaporation at low substrate temperatures and that they adhere unexpectedly readily to silicon dioxide so that they are particularly suitable for anti-reflection layers of optical elements consisting of an organic material.

The layer construction of the invention produces an especially advantageous anti-reflection multilayer coating as the oxides described adhere unexpectedly readily—as already stated—to silicon dioxide ($SiO_2$).

This good adherence property of the oxides to silicon dioxide is of particular advantage when the optical element consists of an organic material to which the oxides would only adhere poorly. In this case, too, a readily adhering anti-reflection film can be obtained according to the invention when the layer deposited directly on the organic material consists of silicon dioxide on which the corresponding metallic oxide is deposited and to which it readily adheres.

Particularly advantageous multilayer coatings with three layers are described herein, which show a very good anti-reflection property with a very simple construction. This construction has the additional advantage that in addition to the anti-reflection property, an improvement in the surface hardness is also achieved due to the thick first layer consisting of silicon dioxide.

The anti-reflection film according to this invention is used most advantageously for an ophthalmic spectacle lens consisting of a conventional organic material, e.g. diethylene glycol-bis-allyl carbonate, polycarbonate or PMMA. According to claim 10 this organic material preferably has a refractive index of 1.5. Naturally, high refractive organic materials such as those described in DE-OS 33 90 081, EU-OS 0 059 561 and UK patent application 2 076 836 can also be used. The high refractive layer according to this invention consisting of one of the metallic oxides described may, furthermore, also be used, for example for lenses consisting of an organic material, for any number of purposes.

The metallic oxides selected according to this invention have the advantage that they need not be applied reactively. Furthermore, they also have the further surprising advantage that readily adhesive layers can be produced at low substrate temperatures.

BRIEF DESCRIPTION OF THE DRAWING

The invention is described in detail below using an example of one version and with reference to the drawing whose single FIGURE shows a cross-section through a layer construction according to this invention.

METHOD OF CARRYING OUT THE INVENTION

Three layers, 2, 3 and 4, are for example, deposited by evaporation on an optical element 1 consisting of an organic material, for example diethylene glycol-bis-allyl carbonate, polycarbonate or PMMA.

The first layer 2, deposited directly on the organic material, consists of silicon dioxide ($SiO_2$) which has a refractive index close to that of the organic material (1.5).

The middle layer 3 consists of one of the metallic oxides described above, which has a comparatively high refractive index, while the uppermost layer 4 again consists of silicon dioxide with a comparatively low refractive index.

In the example version preferred and shown here, layer 2 has a thickness of about 0.1 to 5 $\mu$m and layer 4 a thickness of $\lambda/4$, where $\lambda$ is a "center-of-gravity" wavelength of the incident light. The middle layer 3 consisting of one of the metallic oxides described above preferably has a thickness of $\lambda/10$ when the first layer 2 has a thickness of about 2 $\mu$m.

In addition to the layer construction shown, further modifications are, of course, possible; for example, additional layers consisting of other high refractive materials can be used.

We claim:

1. An anti-reflection film for a clearly transparent optical element (1) of organic material, the film consisting substantially of a multi-layered body wherein a first layer (2) is deposited directly on the optical element, the first layer being comprised of $SiO_2$ with a thickness in the range of from 0.1 $\mu$m to 5 $\mu$m, a middle or second layer (3) comprising of at least one from the group consisting of dysprosium oxide ($D_2O_3$), erbium oxide ($Er_2O_3$), europium oxide ($Eu_2O_3$), holmium oxide ($Ho_2O_3$), neodymium oxide $Nd_2O_3$), samarium oxide ($Sm_2O_3$), terbium oxide ($Tb_4O_7$), ytterbium oxide ($Yb_2O_3$) and yttrium oxide ($Y_2O_3$), neodymium oxide ($Nd_2O_3$), samarium oxide ($Sm_2O_3$), the middle layer (3) having a thickness less than $\lambda/10$ and an upper layer (4) comprised of $SiO_2$ and having a thickness of $\lambda/4$, where $\lambda$ is the "center-of-gravity" wavelength of the incident light.

2. A film according to claim 1, characterized by the fact that said first layer (2) has a thickness of about 2 $\mu$m.

3. A film according to claim 1, characterized by the fact that said middle layer (3) has a thickness of $\lambda/10$ to $\lambda/20$.

4. A film according to one of the claims 1 to 3, characterized by the second layer being deposited in a non-reactive process.

* * * * *